Patented Aug. 17, 1937

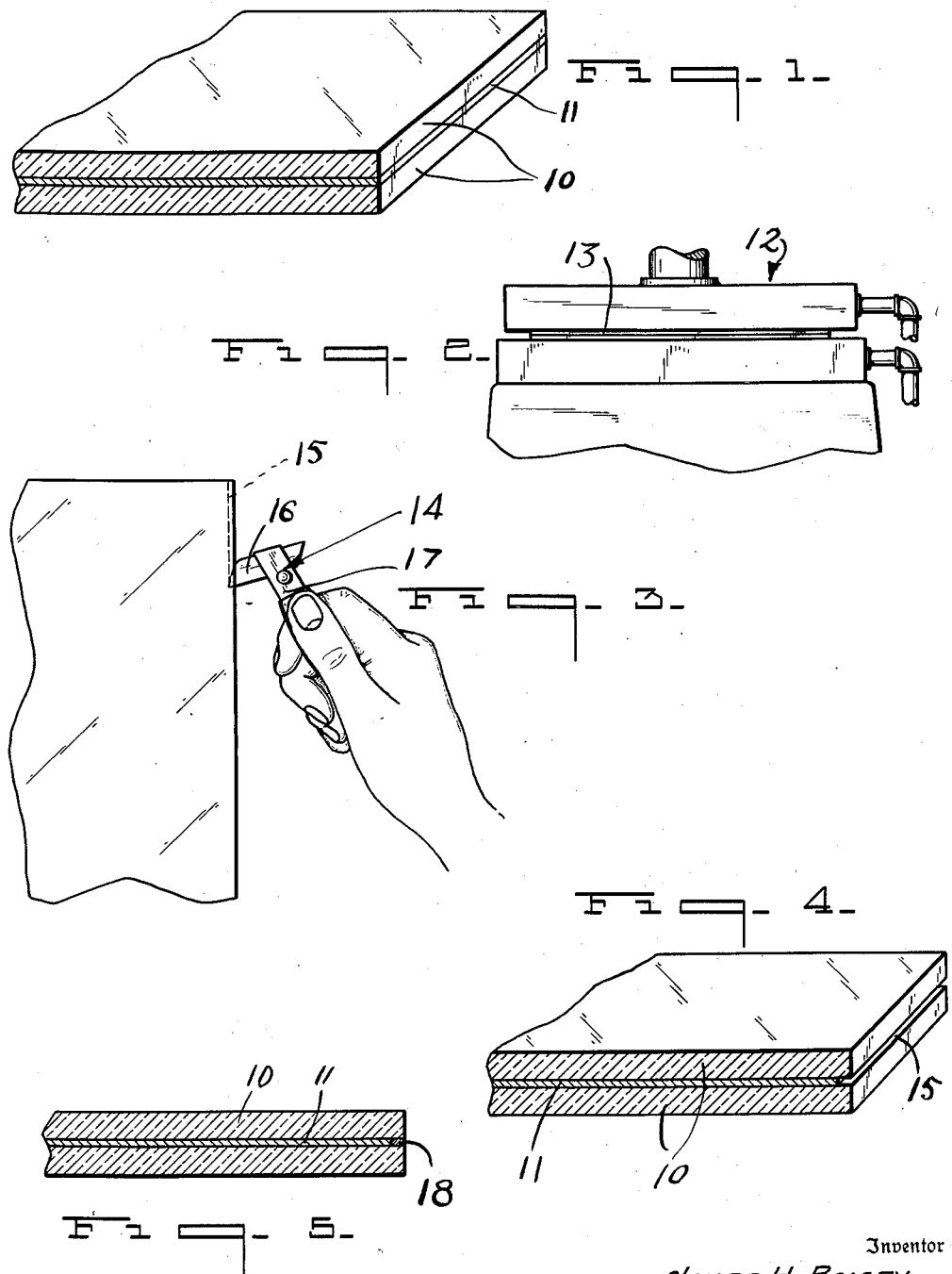

2,089,991

UNITED STATES PATENT OFFICE 2,089,991

PROCESS FOR UNDERCUTTING LAMINATED SAFETY GLASS

James H. Boicey, Toledo, Ohio, assignor to Libbey-Owens-Ford Glass Company, Toledo, Ohio, a corporation of Ohio Application March 20, 1935, Serial No. 11,937

5 Claims. (Cl. 49—81)

The present invention relates to a process for undercutting laminated safety glass to create a marginal channel for receiving a weather-resisting sealing material.

Laminated safety glass is a composited structure ordinarily formed by bonding a cellulose derivative plastic sheet such as, for example, pyroxylin plastic or cellulose acetate plastic, between two sheets of glass. It is generally the custom to protect the bond between the laminations and the plastic lamination itself from the effects of the atmosphere by undercutting or removing the marginal portions of the plastic to a depth of about one-eighth inch to create a channel adapted to receive some weather-resisting sealing compound.

One well known method of removing the marginal portions of the plastic has been to immerse the composited structure into a bath of solvent such as acetone and to leave the glass in this solvent a sufficient length of time to permit penetration to the desired depth. Upon removal of the soaked glass from the solvent bath, scraping tools have been employed to remove the solvent softened portions of the plastic. In normal production, it requires about one and one-half to two hours of acetone treatment at ordinary room temperatures to soften laminated safety glass made with cellulose acetate plastic to the desired depth. Ordinary grades of commercial acetone have been used for this purpose. Where laminated safety glass is produced on a large scale, the space required for solvent tanks and equipment required for soaking has been considerable, and of course there is an element of danger in having large vats of acetone in a factory.

The main object of the present invention is to provide a process particularly adapted for use in the undercutting of laminated safety glass made using cellulose acetate plastic as the non-brittle portion of the structure. I have found that in lieu of solvent soaking the laminated safety glass can be heated for a short time and the marginal portions of the plastic readily removed by a scraping tool without resorting to any solvent soaking or treatment other than elevation of temperature of the laminated structure.

While the same process can be used for effecting undercutting of the various cellulosic derivative plastics, nevertheless I consider it more desirable for the cellulose acetate plastic than it is for pyroxylin plastic, because heating of the pyroxylin plastic may shorten its life. However, with the cellulose acetate plastic, the heating treatment has not been found to in any way adversely affect the life of the plastic. For best results, the heating should not be greatly in excess of 180° F. because if the plastic is heated to 200 to 250 degrees Fahrenheit, for example, the plastic becomes sufficiently soft and gummy to pull away from the corners, leaving an irregular edge.

Other objects and advantages of the invention will become more apparent during the course of the following description when taken in connection with the accompanying drawing.

In the drawing wherein like numerals are employed to designate like parts throughout the same, Fig. 1 is a fragmentary perspective view, partially in section, illustrating diagrammatically a sheet of laminated safety glass, Fig. 2 is a diagrammatic representation of one means that can be employed to effect heating of the laminated safety glass to permit removal of the marginal portions of the plastic by dry scraping, Fig. 3 is a fragmentary plan view showing mechanical removal of the marginal portions of the plastic following the heating operation, Fig. 4 is a fragmentary perspective view showing the laminated safety glass after the seal-receiving channel has been created, and Fig. 5 is a fragmentary vertical sectional view through a sheet of laminated safety glass provided with a weather-resisting seal.

As shown in Fig. 1, the laminated safety glass sheet is composed of two sheets of glass 10 between which is permanently bonded a plastic layer 11. While the three lamination form has been shown, it will be understood that a greater number of glass and plastic laminations can be treated in just the same way as the three lamination production. Likewise, the present invention is in no way concerned with the particular materials used in or method of fabricating the laminated sheet. However, the process is particularly recommended where the plastic layer 11 is a cellulose acetate plastic.

After the laminations have been bonded together by whatever means selected, they are subjected to a heating treatment to raise the temperature to a range from approximately 163° F. to 180° F. In Fig. 2 an ordinary heated platen press 12 is shown, with the laminated sandwich 13 being disposed between the platens of the press for heating to the range just mentioned. Any preferred heating means can be employed and on large scale production it is suggested that a continuous conveyor passing through a heated tunnel be used in lieu of the platen presses.

After the laminated sheet has been heated, it is removed from the heating means and a mechanical scraper 14 employed to rout out or undercut the marginal portions of the heated plastic. Ordinarily, the depth of the channel 15 formed is in the neighborhood of one-eighth inch. The scraping tool 14 employs the blade 16 having a thickness slightly less than the thickness of plastic 11 so that the blade, when gripped by the operator by means of the handle 17, can be moved freely between the glass sheets to scrape out the softened plastic to the desired depth.

It has been found that after the heat treatment, the tool 14 can be worked between the glass sheets to remove the plastic with very little difficulty. To insure accuracy of plastic removal, depth gauges can be associated with the blade 16, and this may be desirable when unskilled workmen attempt the undercutting operation.

In Fig. 4 is illustrated more clearly the channel 15 formed by removal of the edges of the plastic, and in Fig. 5 the channel is shown as having been filled with a water-proof or weather-resisting compound to form the seal 18.

While a preferred range of temperature has been set forth above, it will be appreciated that properties of cellulosic plastic vary with the different sources of raw cellulosic material and with the particular composition employed to give the plastic mass. The main point is that the plastic is stable at elevated temperatures and is heated sufficiently high to facilitate dry scraping of the marginal portions thereof to form the seal-receiving channel, without softening to the point where tearing or pulling of the plastic will result in an uneven condition.

The above process has been used in commercial production and it has been found that the glass can be much more quickly undercut than with the old soaking method and that the results are entirely satisfactory.

It will of course be appreciated that the scraping of the marginal portions takes place while the plastic is still in a heated condition because as the plastic cools to room temperatures, it becomes more rigid.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:
1. The process of undercutting laminated safety glass composed of two sheets of glass and an interposed layer of adherent cellulosic plastic material, consisting in heating the laminated safety glass sufficient to soften the marginal portions of the plastic but insufficient to cause burning or decomposition of said plastic, and then, while the plastic is still in the heat softened condition, removing the marginal portions thereof to the desired depth.

2. The process of undercutting laminated safety glass composed of two sheets of glass and an interposed layer of adherent cellulosic plastic material, consisting in heating the laminated safety glass to a temperature sufficient to soften the marginal portions of the plastic but at a temperature inadequate to have a deleterious effect upon the plastic or bond between the plastic and glass, and then mechanically removing the marginal portions of the plastic from between the glass to the desired depth before the laminated safety glass arrives at room temperatures again.

3. The process of undercutting laminated safety glass composed of two sheets of glass and an interposed layer of adherent thermoplastic material, consisting in heating the marginal portions of the plastic sufficient to soften the same but insufficient to cause burning or decomposition of said plastic, and then, while the plastic is still in the heat softened condition, removing the marginal portions thereof to the desired depth.

4. The process of undercutting laminated safety glass composed of two sheets of glass and an interposed layer of adherent thermoplastic material, consisting in heating the marginal portions of the plastic sufficient to soften the same but insufficient to cause burning or decomposition of said plastic, and then, while the plastic is still in the heat softened condition, passing a thin blade between the glass sheets to remove the heat softened plastic to the desired depth.

5. The process of undercutting laminated safety glass composed of two sheets of glass and an interposed layer of adherent thermoplastic material, consisting in heating the marginal portions of the plastic to a temperature sufficient to soften the same but at a temperature inadequate to have a deleterious effect upon the plastic or bond between the plastic and glass, and then, while the plastic is in a heat softened condition, removing the marginal portions thereof to the desired depth.

JAMES H. BOICEY.